April 30, 1968  E. L. MARTIN  3,380,748

HYDRAULIC SUSPENSION SYSTEM FOR MOTOR VEHICLES

Filed June 3, 1966

INVENTOR.
EMMET L. MARTIN
BY
Richard D. Law
ATTORNEY

United States Patent Office 3,380,748
Patented Apr. 30, 1968

3,380,748
HYDRAULIC SUSPENSION SYSTEM FOR MOTOR VEHICLES
Emmet L. Martin, Littleton, Colo., assignor to American Coleman Company, Littleton, Colo., a corporation of Nebraska
Filed June 3, 1966, Ser. No. 555,102
9 Claims. (Cl. 280—6)

This invention relates to fluid suspension systems for vehicles, and particularly to a hydraulic suspension system for motor trucks and especially for motor trucks having more than two axles.

A number of different fluid suspension systems for motor vehicles have been proposed where fluid springs of a suspension system are used, either in conjunction with or to replace mechanical leaf springs. Such systems provide a hydraulic cylinder between the truck body and the axle immediately below the connection of the hydraulic cylinder to the truck body. The hydraulic system, generally between two wheels on the same axle, includes an accumulator to equalize the pressure in the two hydraulic cylinders, providing a uniform riding of the truck body as the vehicle passes over the road.

According to the present invention a hydraulic spring and shock absorber system is provided in which the individual wheels of a vehicle are individually sprung by a double-acting hydraulic cylinder with a hydraulic accumulator mounted in the hydraulic fluid lines of the double-acting hydraulic cylinders, with one accumulator in one hydraulic circuit which acts as a spring and an accumulator on the other hydraulic circuit which acts as a shock absorber. The system, furthermore, provides means for raising or lowering the bed of the vehicle to which the hydraulic cylinders are attached for accommodation to dock height or riding height. In one instance, an individual cylinder may be used for raising a single wheel out of contact with the road in the event of a flat tire, thereby permitting short distance traveling. Additionally, by controlling the pressure in the hydraulic fluid circuit of the spring system, the approximate weight of the load in the vehicle may be easily determined by the operator.

It is, therefore, an object of the invention to provide a hydraulic spring system for a motor vehicle in which the system utilizes one double-acting hydraulic cylinder for each individual wheel in the system, and provides an accumulator on both sides of the double-acting cylinders to control the action and the ride qualities of the hydraulic suspension system.

Another object of the invention is to provide a hydraulic suspension system in which the cylinders may be individually controlled for raising or lowering the wheel attached thereto.

Another object of the invention is to provide a means for raising or lowering the level of the bed of the vehicle to which the cylinders of a hydraulic suspension system is attached.

These and other objects and advantages of the invention may be readily ascertained by referring to the following description and appended illustrations in which.

Figure 1:
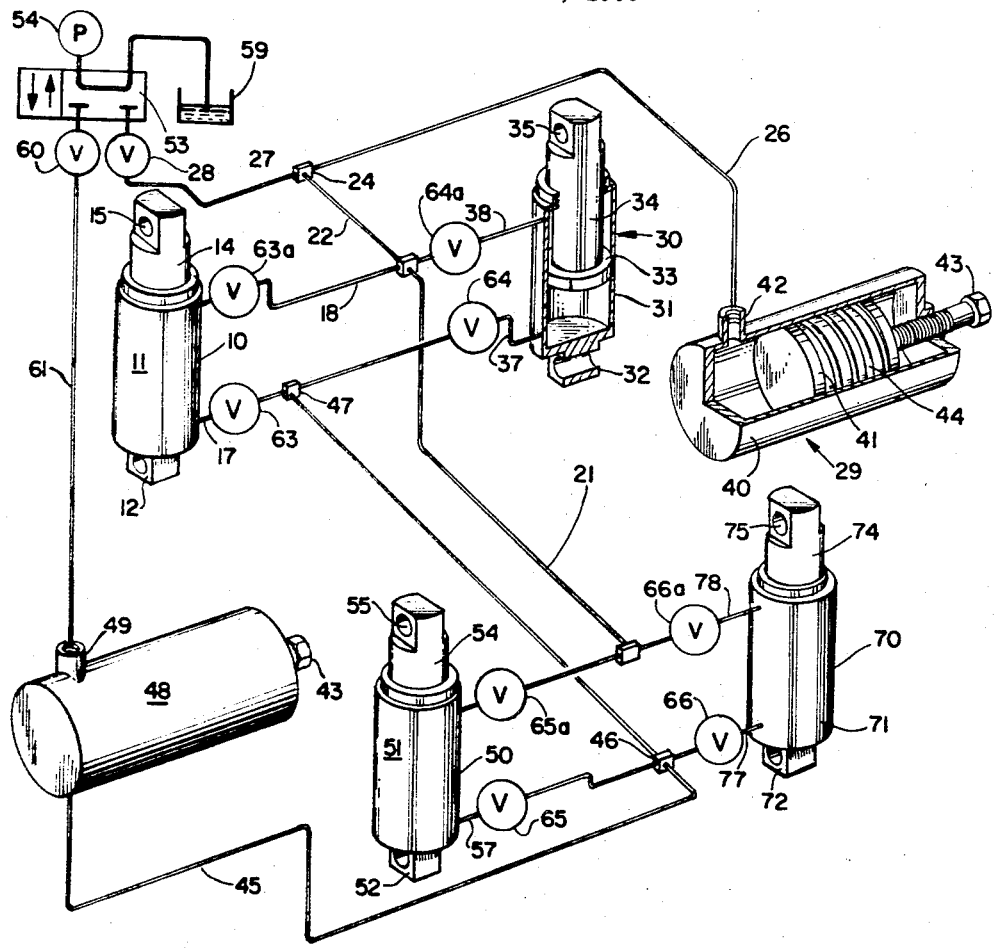
FIG. 1 is a schematic view of a hydraulic system for a vehicle utilizing four double-acting hydraulic cylinders with two accumulators, one for each circuit in the system.

In the system shown in FIG. 1, four hydraulic cylinders are used in the suspension system. The cylinder system may be used with a vehicle having two axles and four wheels, or it may be part of a system for a vehicle having more than two axles. The system is applicable to more than four cylinders connected together, or for as few as two (usually on opposite sides of the vehicle); however, a teaching of all is believed sufficient by the description of a system for four cylinders. The cylinders, shown by numerals 10, 30, 50 and 70, are double-acting cylinders and, as shown by the cut-away of cylinder 30, provide a hydraulic spring-shock absorber system for motor vehicles. As shown, the cylinders are in the downward position, with cap or blind end down and the rod in the upper position; however, the reverse position for the cylinders is satisfactory. A cylinder barrel 31 is provided with an apertured boss 32 secured to its base for attachment to or near the axle of the vehicle, and a piston 33 reciprocably mounted in the cylinder is provided with a piston rod 34. An opening 35 in the piston rod provides means for attachment to a portion of the vehicle bed as is conventional. A hydraulic line 37 is connected to the blind end of the cylinder communicating with the space below the head of the piston in the cylinder 31, and a line 38 is connected to the cylinder communicating with the space at the rod end. In a similar manner, the cylinder or hydraulic spring-shock absorber 70 is provided with a cylinder barrel 71 having an apertured boss 72 for connection to the opposite side of the axle of the vehicle to which cylinder 30 is attached, and a piston rod 74 having an opening 75 for connection with the truck bed. The space at the blind end of the cylinder is provided with hydraulic fluid by means of a line 77 and the opposite side of the piston is provided with fluid from a line 78. Similarly, the hydraulic spring 10 is provided with equivalent parts, including a cylinder barrel 11 with attachment 12 for an axle, a piston 14 and its attachment means 15 to a truck body. A line 17 provides hydraulic fluid for the space at the blind end of the cylinder, and line 18 provides hydraulic fluid for the rod end of the cylinder. The cylinder or hydraulic spring 50 is provided with a cylinder barrel 51 and its axle connection 52, piston 54 and its truck connection 55. The double-acting cylinder is provided with hydraulic fluid from line 57 to the space at the blind end of the cylinder, and to the rod end by means of line 58.

The hydraulic lines leading to the top of the cylinder are interconnected by a feeder line 26 with lines 21 and 22 therein leading to the lines 18, 38, 58 and 78. A T 24 provides means for splitting the main line to the line 26 and a line 27 leading to a supply of fluid. The pressure line 27 is normally controlled by a valve 28, and line 26, normally open, leads to an accumulator 29. The accumulator 29 includes a cylinder barrel 40 having a piston 41 reciprocally mounted therein and an inlet 42 for the hydraulic line 26. The piston is backed by a spring 44 which is controlled by a set screw 43. In this manner, with the valve 28 closed, the pressure in the lines leading to the top side of the pistons of the four cylinders may be controlled within limits by adjusting the set screw 43. The line 27 is connected through valve 28 and a four-way valve 53 and a reservoir 59 to a pump 54. The four-way valve is conventional for charging the line 27 with fluid or releasing the same to the reservoir.

The lines leading to the bottoms of the cylinders are all interconnected to a line 45 through a cross 46 and a T 47 which connect to the lines 57 and 77, and 17 and 37, respectively. The line 45 is connected to a second accumulator 48, of similar construction to that of accumulator 29, having a set screw 43 for adjusting a piston internally thereof. The accumulator is, also, provided with an inlet line 49 connected through a line 61 to valve 60 and the four-way valve 53 to pump 54 and reservoir 59. Each of the lines leading to the bottom of the piston is provided with a valve, for example, cylinder 10 is provided with a valve 63, cylinder 30 with a valve 64, cylinder 50 with a valve 65, and cylinder 70 with a valve 66. The upper lines are provided with equivalent valves 63a, 64a, 65a and 66a controlling the rod ends of cylinders 10, 30, 50 and 70. This permits a cylinder to be isolated from both systems for repair, prevent loss of oil, hold a raised tire, etc.

The double-acting cylinders in the system provide a spring action and a shock absorbing action. In FIG. 1 there is shown a bottom circuit which is connected to the cap or blind ends of the cylinders and this system acts as a spring. The height of the piston rods may be adjusted or controlled by the pump 54 to provide a pressure in the system for the type of ride desired for the particular load and road condition. The accumulator controls the spring system under running conditions. The shock absorbing action is taken care of by the upper hydraulic circuit or that which is connected to the rod ends of the cylinders. The accumulator 29 provides a control for this shock system under road operation. The pressure in the hydraulic spring circuit may be increased by means of the pump 54 to extend the cylinders. With light loads the pressure in the spring system may be reduced to provide the ride characteristics desired, and as the load increases the pressure may be increased to adjust the height of the bed in relation to the load. The control 43 on the accumulator 48 may, also, be used to some extent to control the pressure in the spring hydraulic circuit of the system. In a like manner, the shock absorber circuit may be controlled by the control bolt 43 in the accumulator 29. It is, of course, obvious that by increasing the pressure on the piston 41, by tightening the bolt against the spring 42, the pressure in the circuits will be increased. The pressure in either circuit may be reduced by loosening the bolt to relieve the pressure of the piston on the system. Under normal circumstances the hydraulic spring system (lower system) is at a substantially higher pressure than the shock absorber circuit, since the spring circuit must carry the load of the truck as well as the weight of the truck itself. The shock absorber system, however, has a normal function to damp the movement of the spring system. The cylinders are, therefore, designed to permit a cushioned ride to the body and the cargo. The cushioning of the vehicle is, also, important in preventing major road shocks to the highway surface, which is of incalculable value in prolonging the life of the highway itself.

The height of the vehicle bed, which is connected to the piston rods, may be increased by increasing the pressure in the lower circuit and relieving the pressure in the upper circuit to raise the piston and thereby raising the bed of the vehicle itself. Additionally, the level of the truck may be lowered by decreasing the pressure in the lower circuit, permitting the upper circuit to equalize or by injecting more hydraulic fluid to maintain the pressure in the upper circuit. The valves 60, 28, and the four-way valve 53 may be conveniently placed in the cab for easy control of the system by the driver. Normally, the pressure of each system is adjusted to that desired and valves 28 and 60 closed for running.

The weight of the load in the truck may be determined by the hydraulic system, by ascertaining the pressure in the hydraulic spring system when the entire load is carried by the hydraulic cylinders or when the cylinders are at a predetermined height. The piston rods may be provided with a single line which is related to the empty truck weight and the leaf spring tension. By providing sufficient hydraulic fluid to bring the rods to the predetermined point, the weight of the load is determined by a pressure gauge calibrated to the system. The weight on the truck may, also, be determined by increasing the hydraulic pressure to a point where the entire load is carried by the hydraulic cylinders. Thus, after loading the pressure is increased to raise the pistons to a predetermined height, the pressure is a measure of load and may be calibrated in pounds load. The dead weight of the truck must be known and calibrated on the pressure gauge, and the pressure ascertained to raise the cylinder to the point which is above where helper springs carry a part of the load. The hydraulic pressure may then be determined by a gauge and the load on each cylinder estimated.

Figures 2, 3, 4:
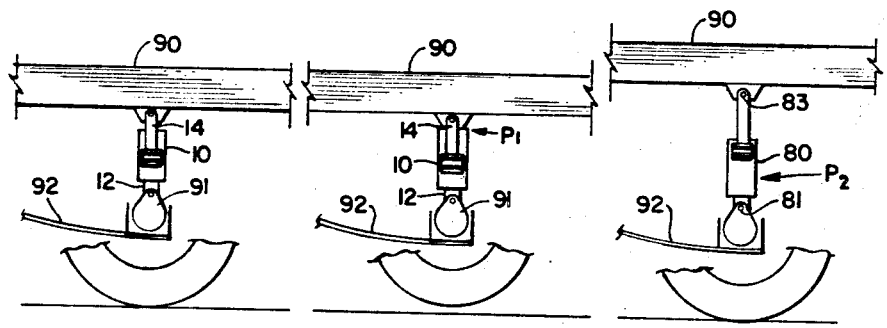
FIG. 2 is a partial schematic detailed view of a hydraulic system showing a normal configuration for road operation of a cylinder between a tire and the bed of the vehicle.
FIG. 3 is a partial, schematic, detailed view of a hydraulic cylinder in condition raising one tire of a vehicle above the roadway according to the invention.
FIG. 4 is a partial schematic view of a cylinder system with the cylinder extended for raising the bed of the vehicle.

As shown in FIGS. 2, 3 and 4 various operations may be performed with the system of the invention. In FIG. 2 a truck bed 90 is connected to the piston rod 14 of a hydraulic cylinder 10. The bottom connection of the cylinder 12 is attached to an axle housing 91. A single leaf, flat spring 92 provides a helper spring action between the axle and the truck, the spring being extended forward and rearwardly of the axle and attached to shackles to the truck, such connection being common and the same is not shown. For normal operation the piston is centered in the cylinder to provide carrying capacity for a load in the truck, any shock is partly taken up by the flat spring, partly by the cylinder, and partly by the shock absorber side of the cylinder. Where it is desired to lift a wheel, as in the case of a flat tire, the pressure in the shock absorber system is increased, as shown in FIG. 3, by P–1 to that greater than the hydraulic pressure in the lower system. The valve in the upper system of that cylinder may be closed when the piston is fully extended into the cylinder. This may be done by releasing the pressure on the spring or lower hydraulic system and increasing the pressure on the entire shock system. This will extend all the pistons fully into their cylinders. By closing the valves of the cylinder near the flat tire and by pressurizing the lower system the truck bed is raised, by means of the other cylinders, to the desired level, but the flat tire will be raised off the ground, as shown in FIG. 3. Also, the other cylinders may be blocked off and the flat tire raised alone. As shown in FIG. 4, by increasing the pressure of the lower system, indicated by P–2, the truck bed 90 may be raised to level with a loading dock, or the like.

In operation on the road, the accumulators will absorb excess shock of the hydraulic fluid as the truck rocks, sways, and when the wheels strike bumps or depressions in the highway, thus levelizing the ride and reducing the shock of bumps and depressions in the highway. The valves in the hydraulic lines may be manual or remote controlled valves, as by electric, hydraulic means to provide means for the operator to control such valves from the cab. In a similar manner, the pump for the systems may be readily controlled by the operator from the cab to provide a ready and easy method of controlling the amount of hydraulic fluid and/or the pressure in each system and thus controlling the quality of the ride for the particular load. With sufficient valving, the systems may be made to operate from the operator's cab for lifting a wheel in the event of a flat tire; however, under normal conditions flat tires are so infrequently met that providing remote control valves for lifting a single wheel may be an unwarranted expense. While a particular type of accumulator has been shown, other types of accumulators, such as gas pressured accumulators, may obviously be used with due regard to capacity, both volumetric and pressure. Additionally, the system may be unitized for single axles in which two opposed cylinders are mounted on a single axle, and such a system would need a pair of accumulators, a pump and reservoir to be a complete system. As the system may be made in sets of four, as shown in FIG. 1, for either a four wheel truck or provide a hydraulic system for one set of four wheels on the truck with a similar system for another set of two or four wheels on a six or eight wheel truck, respectively. The system provides an added advantage in that the vehicle may proceed to a safety area or an area for maintenance in the event of an axle or a tire failure by hydraulically elevating either a complete axle (on trucks with three or more axles) or one tire of any axle. This not only prevents delay of the particular vehicle, but, also, prevents causing traffic jams which frequently occur when repair of a large truck on the highway is necessary. Where desired, flow dividers, flow control valves and the like may be used in the system for particular purposes such as controlling the rate of fluid flow from cylinder to cylinder.

While the invention has been illustrated by reference to a particular embodiment, there is no intent to limit the spirit or the scope of the invention to the precise details so set forth except as defined in the following claims.

I claim:

1. A suspension system for a motor vehicle including a hydraulic spring assembly for each wheel of the vehicle, comprising a double-acting hydraulic cylinder mounted adjacent each wheel of the motor vehicle and connected to the wheel mounting assembly at one end and to the motor vehicle body thereabove; at least one cylinder mounted on each of opposed wheels on an axle and being interconnected by a first hydraulic line communicating with the chamber on the cap end of each cylinder and interconnected by a second hydraulic line communicating with the rod end of each cylinder; a first hydraulic accumulator mounted in said first hydraulic line; a second hydraulic accumulator mounted in said second hydraulic line; valve means arranged to close the lines leading to the cap and rod ends of each said hydraulic cylinder, the hydraulic pressure in said cap end being normally substantially higher than the pressure in said rod end for carrying the load of the vehicle on hydraulic springs and to provide by the hydraulic system for said rod ends a hydraulic shock absorber for each cylinder; and pump and valve means arranged to increase and decrease the pressure in either end of each cylinder, with the pressure in the cap ends normally sufficiently greater than the pressure in the rod ends to overcome the weight of the vehicle and its load and the pressure in said rod end and move said vehicle body upwardly.

2. A suspension system for a motor vehicle according to claim 1 in which each said accumulator is spring loaded and arranged to be adjustable.

3. A suspension system for a motor vehicle according to claim 1 wherein a hydraulic pump is connected to both said hydraulic lines for varying the hydraulic pressure therein.

4. A suspension system for a motor vehicle according to claim 1 wherein valve means are mounted in said first and second hydraulic lines for varying the pressure therein beyond the capacity of said second accumulator.

5. A suspension system for a motor vehicle according to claim 1 wherein each said accumulator includes a piston and a spring biased against said piston, and adjusting screw means arranged to vary the pressure of said spring on said piston.

6. A suspension system for a motor vehicle according to claim 1 wherein helper springs are mounted adjacent each wheel.

7. A suspension system for a motor vehicle according to claim 1 wherein the piston rod of each hydraulic cylinder is calibrated so as to indicate, in conjunction with a pressure gauge in said first hydraulic system, the approximate weight on each wheel.

8. A suspension system for a motor vehicle according to claim 1 wherein each set of adjacent pairs of axles at the front or rear of the vehicle having at least four wheels mounted thereon and having a hydraulic cylinder mounted adjacent each said wheel are interconnected by said first and second hydraulic lines.

9. A suspension system for a motor vehicle according to claim 1 wherein valve means are mounted in both lines of each said cylinder whereby a predetermined cylinder may be isolated from the system.

References Cited

UNITED STATES PATENTS

| | | | |
|---|---|---|---|
| 3,002,765 | 10/1961 | MacDuff | 280—124 |
| 3,095,214 | 6/1963 | Hanna et al. | 280—124 |
| 3,156,481 | 11/1964 | Dangauthier | 280—6 |
| 3,181,877 | 5/1965 | McHenry | 280—6 |
| 3,191,954 | 6/1965 | Schuetz | 280—6 |

RICHARD J. JOHNSON, *Primary Examiner.*

L. D. MORRIS, *Assistant Examiner.*